US012563599B2

(12) United States Patent
Rietema et al.

(10) Patent No.: US 12,563,599 B2
(45) Date of Patent: Feb. 24, 2026

(54) CONTENTION-BASED ACCESS WITH SPATIAL RE-USE

(71) Applicant: PERASO TECHNOLOGIES INC., Toronto (CA)

(72) Inventors: Albert Klaas Theodoor Rietema, Guelph (CA); Bradley Robert Lynch, Toronto (CA)

(73) Assignee: PERASO TECHNOLOGIES INC., Toronto (CA)

( * ) Notice: Subject to any disclaimer, the term of this patent is extended or adjusted under 35 U.S.C. 154(b) by 0 days.

(21) Appl. No.: 18/531,053

(22) Filed: Dec. 6, 2023

(65) Prior Publication Data

US 2024/0188134 A1      Jun. 6, 2024

Related U.S. Application Data

(60) Provisional application No. 63/386,206, filed on Dec. 6, 2022.

(51) Int. Cl.
| | |
|---|---|
| *H04W 74/0816* | (2024.01) |
| *H04B 17/318* | (2015.01) |
| *H04W 74/04* | (2009.01) |
| *H04W 76/25* | (2018.01) |

(52) U.S. Cl.
CPC ...... *H04W 74/0816* (2013.01); *H04B 17/328* (2023.05); *H04W 74/04* (2013.01); *H04W 76/25* (2018.02)

(58) Field of Classification Search
None
See application file for complete search history.

(56) References Cited

U.S. PATENT DOCUMENTS

| | | | |
|---|---|---|---|
| 2016/0366637 A1* | 12/2016 | Barriac | H04W 76/10 |
| 2017/0033845 A1* | 2/2017 | Sanderovich | H04B 7/0808 |
| 2023/0189337 A1* | 6/2023 | Sun | H04W 74/0808 |

* cited by examiner

*Primary Examiner* — Jae Y Lee
*Assistant Examiner* — Nam P. Cao
(74) *Attorney, Agent, or Firm* — Perry + Currier Inc.

(57) ABSTRACT

A method in a communications device includes: maintaining an association between the communications device and a basic service set identifier; detecting a message at a wireless interface of the communications device; determining whether the message is associated with the basic service set identifier; and when the message is not associated with the basic service set identifier, determining whether to update a timer corresponding to transmission medium availability based on a received signal strength of the message.

8 Claims, 5 Drawing Sheets

100

100

300

CONTENTION-BASED ACCESS WITH SPATIAL RE-USE

CROSS-REFERENCE TO RELATED APPLICATIONS

This application claims priority to U.S. Provisional Patent Application No. 63/386,206, filed Dec. 6, 2022, the contents of which is incorporated herein by reference.

FIELD

The specification relates generally to wireless communications, and specifically to contention-based access with spatial re-use in wireless local area networks (WLANs).

BACKGROUND

Wireless local-area networks (WLANs), such as those based on the 802.11 family of standards, implement a contention-based access protocol (CBAP) to share access to the transmission medium between network nodes. Under some conditions, e.g., environments in which multiple basic service sets (BSSs) are deployed in physical proximity, current WLAN systems may make inefficient use of transmission medium.

SUMMARY

An aspect of the specification provides a method in a communications device, comprising: maintaining an association between the communications device and a basic service set identifier; detecting a message at a wireless interface of the communications device; determining whether the message is associated with the basic service set identifier; and when the message is not associated with the basic service set identifier, determining whether to update a timer corresponding to transmission medium availability based on a received signal strength of the message.

Another aspect of the specification provides a communications device, comprising: a wireless interface; and a controller configured to: maintain an association between the communications device and a basic service set identifier; detect a message at a wireless interface of the communications device; determine whether the message is associated with the basic service set identifier; and when the message is not associated with the basic service set identifier, determine whether to update a timer corresponding to transmission medium availability based on a received signal strength of the message.

BRIEF DESCRIPTIONS OF THE DRAWINGS

Embodiments are described with reference to the following figures.

DETAILED DESCRIPTION

Figure 1:
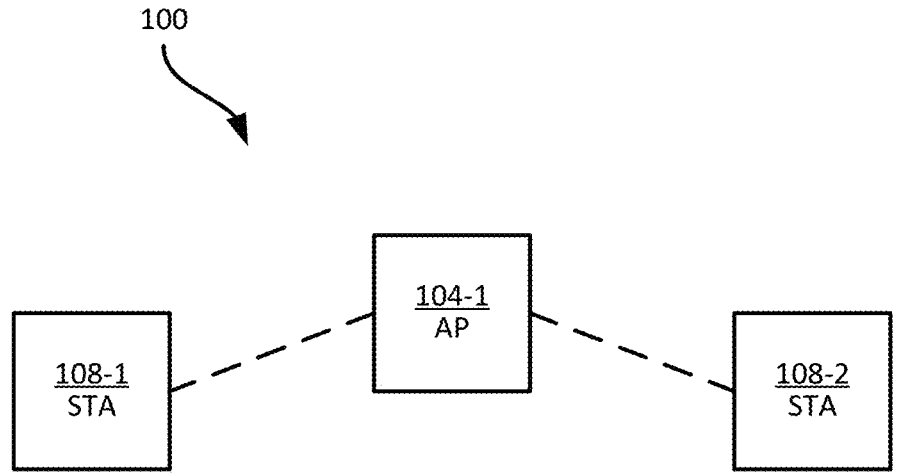
FIG. 1 is a diagram of a communications system including neighboring basic service sets.
Figure 1:
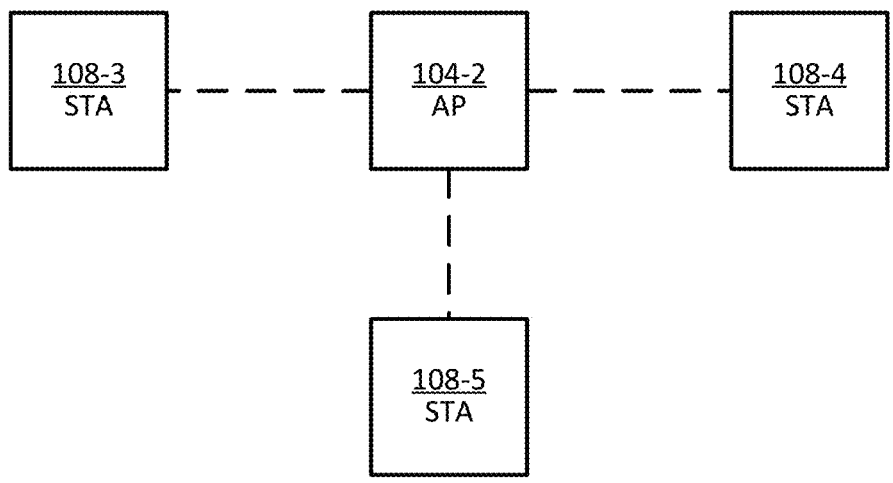

FIG. 1 depicts a wireless communications system 100 for implementing one or more wireless local area networks (WLANs), e.g., based on the 802.11 family of standards. In some examples, the system 100 can implement one or more 802.11ad WLANs, although the functionality described below can also be implemented in WLANs deployed according to other members of the 802.11 family. More generally, as will be apparent to those skilled in the art, the functionality set out below may be deployed in any wireless networking system that makes use of contention-based access control.

For example, the system 100 includes a first basic service set (BSS) including an access point (AP) 104-1, and two wireless clients (also referred to as stations) 108-1 and 108-2. The system 100 also includes a second BSS including an access point 104-2, and three wireless clients 108-3, 108-4, and 108-5. The number of clients 108 in the basic service sets 104-1 and 104-2 can vary over time, and need not be limited to two. In some examples, a given client 108 (the number 108, omitting the hyphenated suffix, is used to refer to the clients 108 collectively, or to any one of the clients 108 generically; similar nomenclature may also be used for other elements herein) may be associated with the first BSS at certain times, and with the second BSS at other times.

The first and second BSSs may provide network coverage over different physical areas, e.g., within a facility or the like. Those coverage areas may overlap in some cases. An AP 104 or a client 108 (that is, a network node more generally), while associated with one BSS, may detect transmissions originating from the other BSS, depending on the physical proximity of the BSSs (e.g., on the distance between the AP 104-1 and the AP 104-2).

As will be apparent to those skilled in the art, the APs 104 and clients 108 can contend for transmission medium access, e.g., by monitoring the transmission medium for activity before initiating transmissions. In some examples, the nodes in each BSS can implement a request to send/clear to send (RTS/CTS) mechanism, as will be understood by those skilled in the art to contend for transmission medium access. Further, each node can maintain a network allocation vector (NAV) or other suitable indication of the time remaining until the medium is expected to be idle. As will be apparent to those skilled in the art, a timer such as that implemented via a NAV can be set in response to any of a variety of messages, including for example CTS frames, that indicate that the medium is claimed for a certain duration. A node may therefore reduce the frequency and/or length of time spent monitoring the transmission medium for availability, e.g., until the NAV timer expires.

When the BSSs are physically close enough for transmissions from within one BSS (e.g., from the client 108-1) to be received within another BSS (e.g., at the client 108-3), transmission activity in the first BSS may also contend with transmission activity in the second BSS. That is, a transmission opportunity for the client 108-1 may lead to the AP 104-1 and the client 108-2 waiting until that transmission opportunity is terminated to attempt to access the transmission medium, and may also lead to the devices of the second BSS waiting until that transmission opportunity is terminated. The first and second BSSs may, however, be sufficiently distant that parallel (rather than sequential) medium access may be feasible without inter-BSS contention. Existing systems (that is, those operating according to the 802.11 standards specifications), however, are not configured to handle contention-based access differentially between neighboring BSSs, and may therefore make less efficient use of transmission medium than may be possible with spatial re-use.

As discussed below, the nodes of the system 100 implement certain functionality to evaluate detected messages and determine whether to update contention-based access timers (such as the NAV value maintained at each node). Under some conditions, this functionality enables a node to ignore a message for contention purposes, such that nodes within both BSSs may initiate contemporaneous transmission opportunities, thus increasing total throughput in the system 100.

Figure 2:
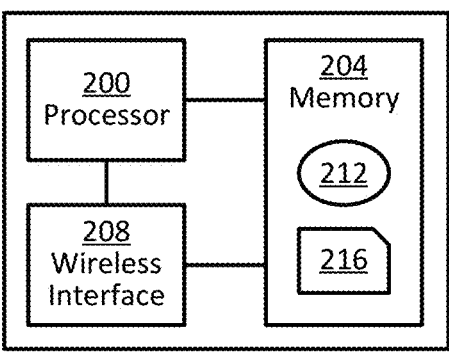
FIG. 2 is a diagram of certain internal components of the nodes in FIG. 1.

Turning to FIG. 2, certain example internal components of the nodes in the system 100 are illustrated. Each of the clients 108 and the APs 104 can include the components shown in FIG. 2, although it will be understood that the specific implementations of such components can vary between clients 108 and APs 104.

Each node in the system 100 includes a processor 200 interconnected with a non-transitory computer readable storage medium, such as a memory 2044, having stored thereon various computer readable instructions for performing various actions. The memory 204 includes a suitable combination of volatile memory (e.g. Random Access Memory or RAM) and non-volatile memory (e.g. read only memory or ROM, Electrically Erasable Programmable Read Only Memory or EEPROM, flash memory). The processor 200 and the memory 204 include one or more integrated circuits.

Each node also includes a wireless communications interface 208 that contains one or more antenna arrays, controllers, memory circuits, and the like. The memory 204 stores instructions executable by the processor 200 to implement the contention-based access functionality set out herein. In particular, the memory 204 stores a communications control application 212 that, via execution by the processor 200, configures the node to process various messages and determine whether to update a local timer 216, e.g., also maintained in the memory 204. In other examples, the application 212 and the timer 216 can be implemented within the interface 208, e.g., by a controller of the interface 208 distinct from the processor 200.

Figure 3:
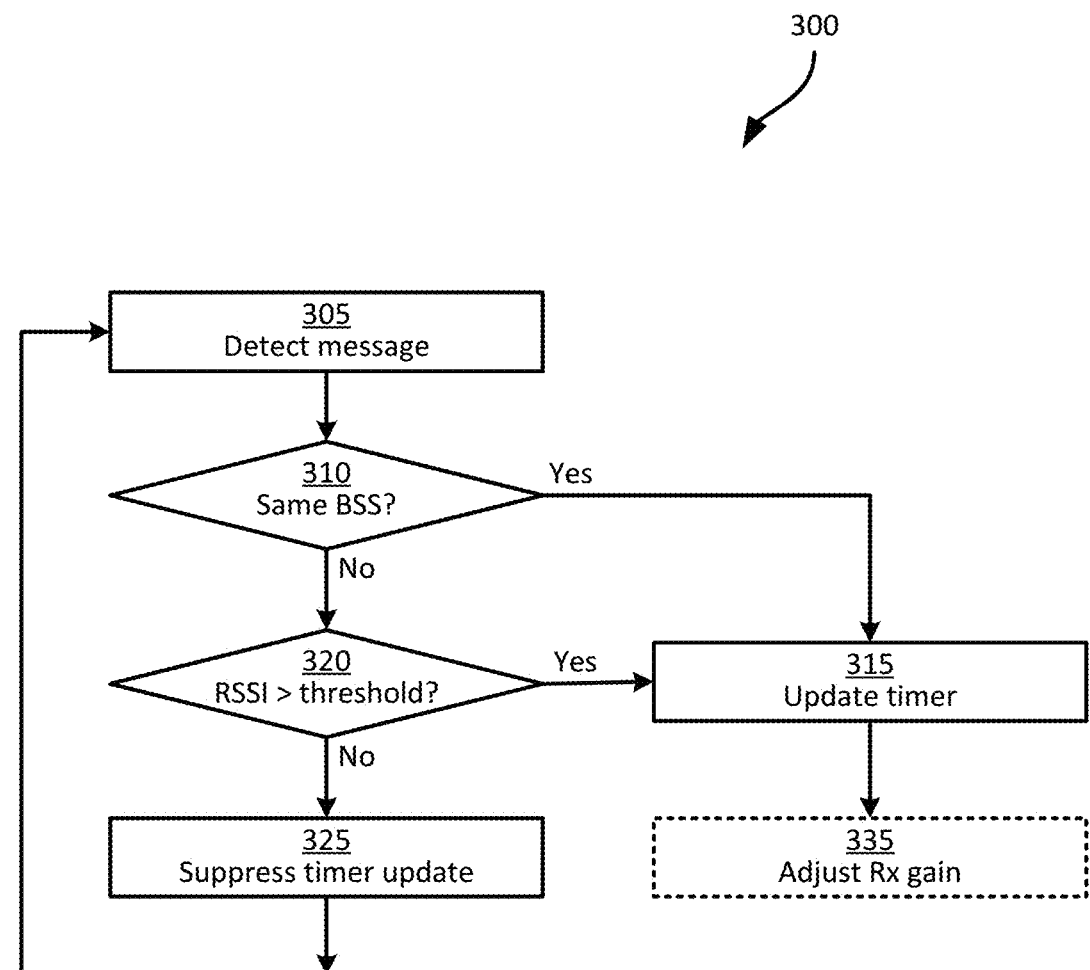
FIG. 3 is a flowchart of a method of contention-based access with spatial re-use.

FIG. 3 illustrates a method 300 of contention-based access with spatial re-use. The method 300 can be performed at each of the APs 104 and the clients 108 of the system 100. That is, each node in the system 100 can implement a distinct instance of the method 300, via a respective copy of the application 212 or equivalent functionality implemented via firmware in the corresponding interface 208.

At block 305, the node is configured to detect a message at the interface 208. The message detected at block 305 can include a management frame, a control frame, a data frame, or the like. The message detected at block 305 may originate from within the same BSS as the node performing block 305, or may originated from a different BSS. At block 310, the node is configured to determine whether the message detected at block 305 originated from within the BSS with which the node itself is associated. For example, the message can include one or more addresses, such as one or more of a receiver address, a sender address, and a BSS identifier (BSSID). The node can be configured to maintain the BSSID of the BSS with which it is currently associated in memory, and can therefore determine at block 310 whether the maintained BSSID matches an address in the detected message. In some examples, the receiver address or sender address fields in the message contain a BSSID, even if the message lacks a dedicated BSSID field.

Certain message types (e.g., ACK frames) may lack a sender address and a BSSID, and therefore cannot readily be assessed at block 310. The node can simply omit processing of such messages via the method 300, and instead handle such messages according to the relevant specification. Other examples of messages that can be omitted from processing via the method 300 include directional multi-gigabit (DMG) beacon frames, sector sweep (SSW) and related frames (e.g., SSW feedback frames, SSW ACK frames, and the like), and denial to send (DTS) frames (which may lack a sender address). Various other examples of frames that can be excluded from processing via the method 300 will also occur to those skilled in the art. For example, in some implementations, specific frame formats can be used to initiate proprietary calibration mechanisms, such as a CTS frame with identical receiver and sender addresses. Such frames can also be excluded, while other CTS frames are still processed via the method 300.

When the determination at block 310 is affirmative, indicating that the message from block 305 originated within the same BSS, the node proceeds to block 315. At block 315, the node is configured to update the timer 216. For example, in the case of a CTS message containing a duration, the node is configured to determine whether the duration is greater than the value of the current timer 216. When the duration in the message from block 305 is greater, the node overwrites the timer 216 with that duration, and can also store, in association with the timer 216, an identifier of the transmission opportunity (TxOp) holder associated with the message. In the case of a CTS frame, for example, the node can store an address (e.g., a media access control (MAC) address) of the receiver identified in the CTS frame. When the duration in the message from block 305 does not exceed the current value of the timer 216, the timer 216 is left unchanged.

When the determination at block 310 is negative, indicating that the message from block 305 originated outside the BSS of the node performing the method 300, the node instead proceeds to block 320. At block 320, the node is configured to determine whether a signal strength, such as a received signal strength indicator (RSSI) associated with the message from block 305, exceeds a threshold. When the determination at block 320 is affirmative, the node can proceed to block 315 as described above. In other words, a message from outside the node's BSS can still lead to an update of the timer 216, if the signal strength of the message is sufficiently high. When the determination at block 320 is negative, however, indicating a relatively low received signal strength for a message from a foreign BSS, the node proceeds to block 325. At block 325, the node is configured to suppress updating of the timer 216. That is, the node is configured to discard the message from block 305 and maintain the previous contents of the timer 216 (e.g., a time period and an identifier of the current TxOp owner, if any). In such a scenario, a claim on the transmission medium from outside the BSS does not prevent a further, simultaneous, claim on the transmission medium from within the BSS.

That is, a negative determination at block 320 may permit parallel access of the transmission medium by nodes within neighboring BSSs. The threshold applied at block 320 can be selected to mitigate the likelihood of interference from simultaneous medium accesses between neighboring BSSs. For example, each node can determine a threshold dynamically by selecting the lowest (e.g., expressed in dBm) RSSI detected in association with other associated nodes (e.g., the AP 104-1 for the clients 108-1 and 108-2, or the clients 108-1 and 108-2 for the AP 104-1), and subtracting a configurable spacing value (e.g., in dB). For example, the configurable value can be 15 dB, although a wide variety of other values can be employed, e.g., depending on the physical arrangement of the system 100, and the like. In other examples, the threshold can be determined dynamically based on a minimum selected from periodic average of RSSI values for associated nodes (e.g., a periodic average for each associated node), and the above-mentioned spacing value.

Figure 4:
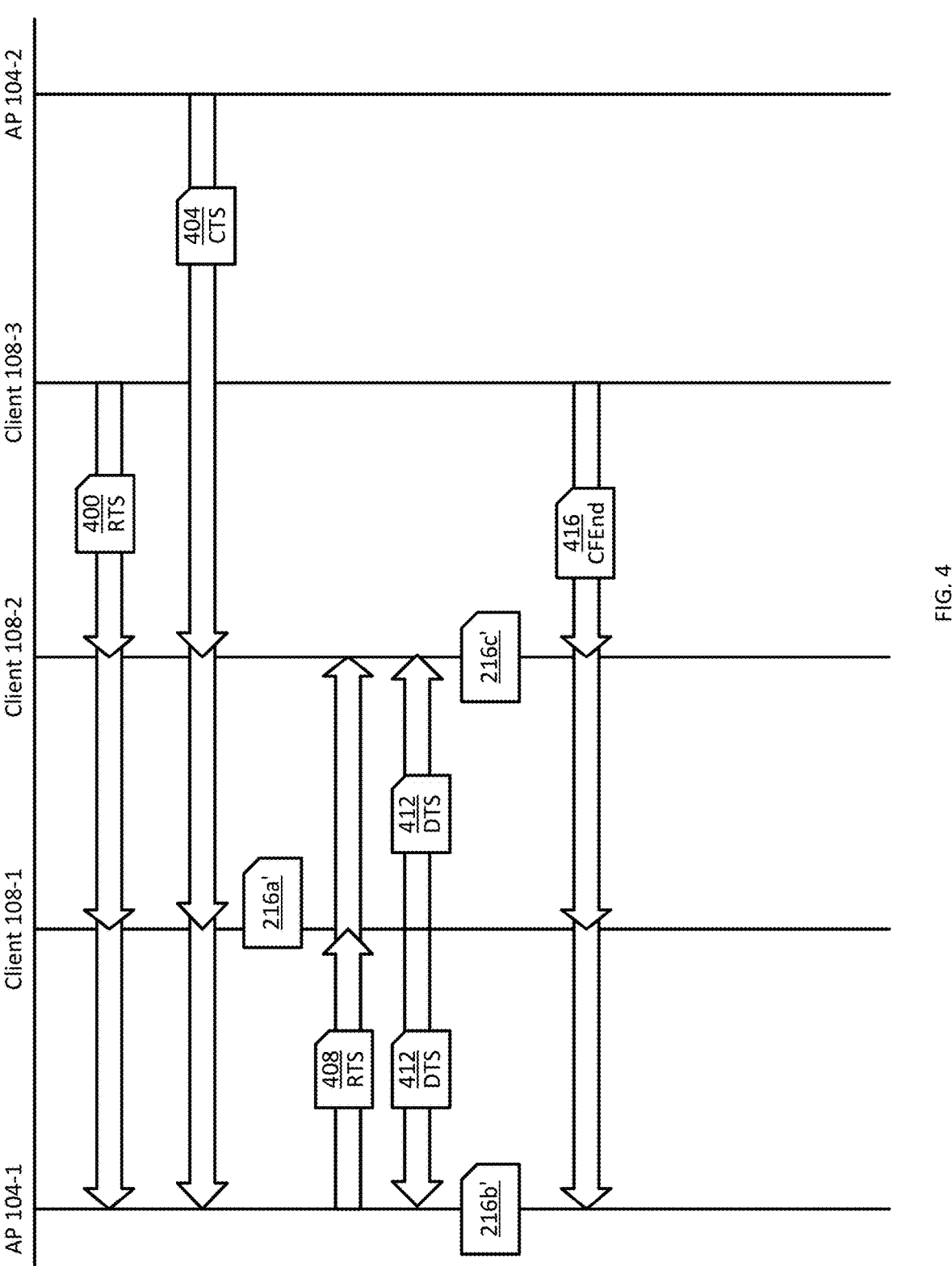
FIG. 4 is a timing diagram illustrating example performances of the method of FIG. 3.

Referring to FIG. 4, an example performance of the method 300 at each of several example nodes is illustrated. In particular, the client 108-3 is shown transmitting an RTS 400, which is detected at each of the clients 108-1, 108-2, and the AP 104-1 via respective performances of block 305. The handling of the RTS 400 within the second BSS is not illustrated in this example. Following detection of the RTS 400, each of the AP 104-1, the client 108-1, and the client 108-2 determine, at respective performances of block 310, that the RTS 400 does not originate within the first BSS. The determination at block 310 is therefore negative, and each of the AP 104-1, the client 108-1, and the client 108-2 proceed to block 320. In this example, the RSSI associated with the RTS 400 at each of the AP 104-1, the client 108-1, and the client 108-2 is below the corresponding threshold, and the determinations at block 315 are therefore negative. The RTS 400, in other words, is ignored by the nodes of the first BSS for the purposes of medium availability, as updates to the timers 216 maintained at the nodes of the first BSS are suppressed.

Subsequently, the AP 104-2 is shown transmitting a CTS 404, e.g., in response to the RTS 400. The CTS 404 is also detected by the nodes of the first BSS. The determinations at block 310 are also negative, and in this example the determinations at block 315 for the AP 104-1 and the client 108-2 are negative, while the determination at block 315 for the client 108-1 is affirmative. The client 108-1 therefore updates its timer 216, e.g., to a timer 216-1' indicating a duration from the CTS 404 and an identifier of the client 108-3. The client 108-1, in other words, now considers the medium unavailable, while the AP 104-1 and the client 108-2 consider the medium idle. Subsequently, e.g., in response to an RTS 408 from the AP 104-1 to the client 108-1, which is detected at the clients 108-1 and 108-2, the client 108-1 returns a DTS 412, because the timer 216a' has not yet expired. The DTS 412 is detected by the AP 104-1 and 108-2, and in turn those nodes update their respective timers 216b' and 216c' with the duration and identifier of the timer 216a'. In other words, in this example at least some nodes of the BSSs are sufficiently physically close that interference may reduce communications performance, and performance of the method 300 results in sequential transmissions.

Following, for example, detection of a CFend message 416 from the client 108-3 releasing a remaining TxOp period, the nodes 108-1, 108-2, and 104-1 may reset their timers 216. For example, CFEnd frames can be handled separately from the method 300, e.g., by determining whether the sender of the CFEnd frame is identified in the timer 216 as the current TxOp holder, and ignoring the CFEnd frame when the sender is not identified in the timer 216.

Figure 5:
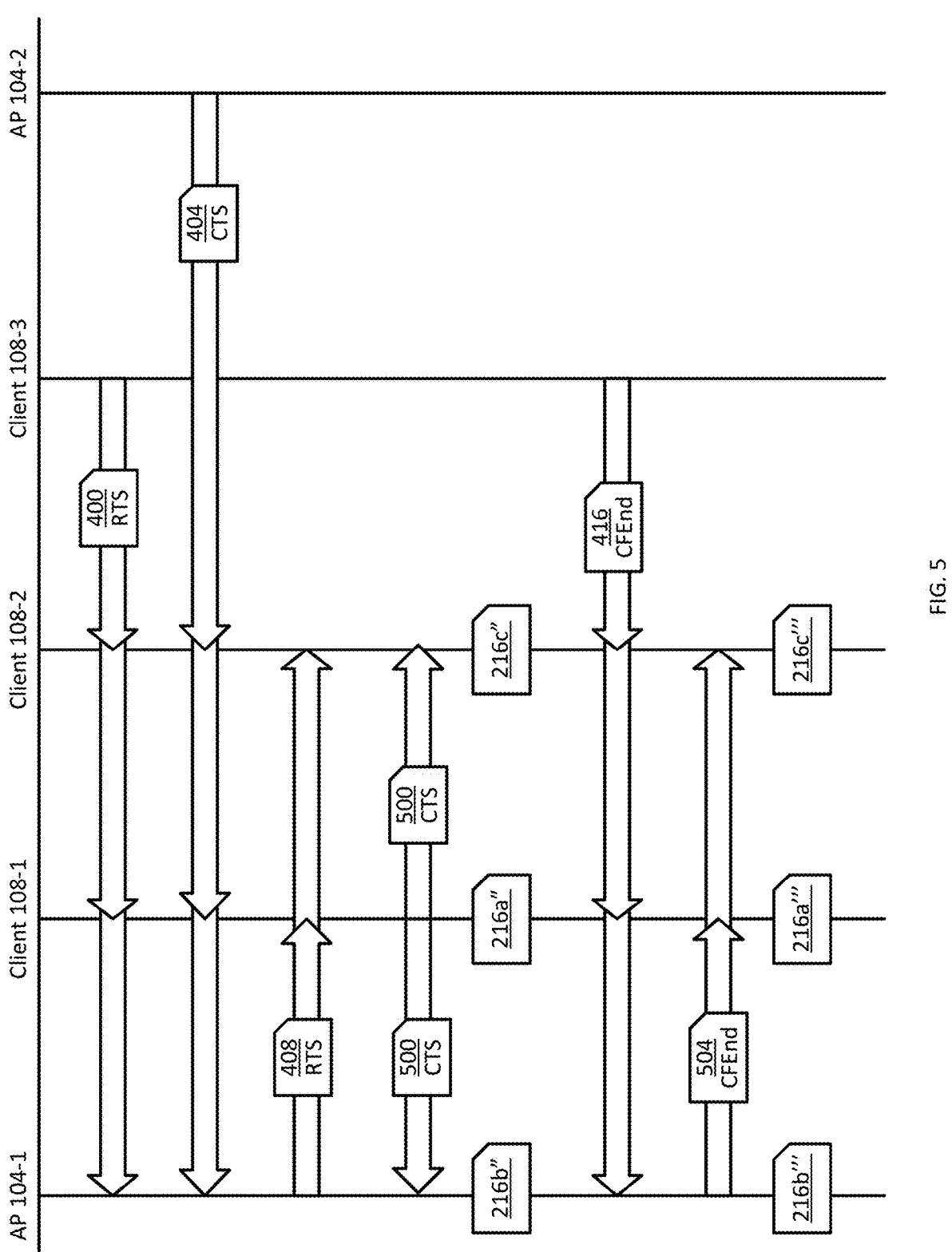
FIG. 5 is a timing diagram illustrating additional example performances of the method of FIG. 3.

FIG. 5 illustrates another example, in which the CTS 404 results in a negative determination at block 315 for all three nodes of the first BSS. The timers 216 of the AP 104-1 and the clients 108-1 and 108-2 are therefore not updated. In response to the RTS 408, therefore, the client 108-1 sends a CTS 500, following which all three nodes of the first BSS update their respective timers 216a", 216b", and 216c". The CFEnd frame 416 is ignored, because the sender does not match the identifier of the AP 104-1 stored in the timers 216a", 216b", and 216c". A subsequent CFEnd 504 from the AP 104-1 results in the timers 216 being reset, e.g., to timers 216a", 216b", and 216c". As will be apparent, in this scenario, simultaneous TxOps occur in the two distinct BSSs.

Returning to FIG. 3, certain additional functions can also be implemented in the system 100. For example, following suppression of a timer update at block 325, a node can optionally implement block 330, at which a restricted detection mode is activated at the node. As will be apparent, a negative determination at block 320 may indicate that an active media claim has begun in another BSS. To avoid detecting and decoding data frames or other frames from that media claim, the node can configured the wireless interface 208 to detect only control frames, thus suppressing detection of data frames and the like. For example, the interface 208 can be configured to monitor the transmission medium for complementary sequences (e.g., Golay sequences), and to initiate decoding only when a number of such sequences detected exceeds a threshold (e.g., 25, although a wide variety of other thresholds can be implemented). As will be apparent to those skilled in the art, frames such as RTS/CTS frames are transmitted at a modulation and coding scheme MCS0, and generally include a greater number of Golay sequences than data frames and the like. The interface 208 may therefore detect and decode such control frames (from either BSS), while ignoring data frames from the other BSS. The restricted detection mode is terminated when the medium is claimed in the local BSS.

In further examples, at block 335, a node can optionally apply a threshold to an automatically adjusted reception gain at the interface 208, e.g., while listening for directed and/or expected transmissions (e.g., a CTS in response to an RTS transmitted by the node, a Block ACK, data frames, or the like). For example, the interface 208 can include an automatic gain control (AGC) module (e.g., a distinct hardware controller, a firmware component executed by a primary controller of the interface 208, or the like) configured to continuously adjust a gain setting based on incoming transmissions detected at the interface 208. The AGC can adjust the gain setting, for example, to maintain an output amplitude (e.g., provided to subsequent components of the interface 208 for processing) at a predetermined level while the input levels vary. The gain setting managed by the AGC may be specified in a number of steps, with the range of gain steps varying between AGC implementations, e.g., with a higher step value indicating higher gain.

The interface 208 can apply a gain threshold, such as a configurable step value above which incoming transmissions are ignored. That is, if the strength of an incoming transmission is low enough that the AGC applies a gain setting above the threshold, the interface 208 can ignore the transmission. If, on the other hand, the strength of the incoming transmission is sufficient to drive the gain setting applied by the AGC below the threshold, the interface 208 can process the transmission, e.g., by detecting and counting Golay sequences as noted above. In some examples, the above gain threshold can be set dynamically based on the spacing value noted above, applied at block 320. In other examples, the gain reduction can be determined from an expected gain setting for the other node, e.g., based on the most recently-received message from the other node. The node can then apply a configurable adjustment factor to the expected gain value, e.g., by adding the adjustment factor (in the event that the next message from the other node is weaker).

Those skilled in the art will appreciate that in some embodiments, the functionality of the application 212 may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

The invention claimed is:

1. A method in a communications device, comprising:

maintaining an association between the communications device and a basic service set identifier;

detecting a message at a wireless interface of the communications device;

determining whether the message is associated with the basic service set identifier; and when the message is not associated with the basic service set identifier, determining whether to update a timer corresponding to transmission medium availability based on a received signal strength of the message, by:

comparing the received signal strength of the message to a threshold; and when the received signal strength is below the threshold, suppressing an update to the timer;

in response to suppressing an update to the timer, activating a restricted detection mode to suppress detection of further messages not associated with the basic service set identifier;

wherein activating the restricted detection mode includes:

detecting a sequence of complementary sequences associated with a further message at the wireless interface;

determining whether a length of the sequence exceeds a length threshold; and when the length does not exceed the length threshold, suppressing detection of the further message.

2. The method of claim 1, wherein determining whether the message is associated with the basic service set identifier includes comparing the basic service set identifier with at least one of a receiver address or a sender address contained in the message.

3. The method of claim 1, further comprising:

setting the threshold based on a received signal strength associated with a second communications device associated with the basic service set identifier.

4. The method of claim 1, further comprising:

when the message is associated with the basic service set identifier, updating the timer based on a duration value contained in the message.

5. A communications device, comprising:

a wireless interface; and a controller configured to:

maintain an association between the communications device and a basic service set identifier;

detect a message at a wireless interface of the communications device;

determine whether the message is associated with the basic service set identifier; and when the message is not associated with the basic service set identifier, determine whether to update a timer corresponding to transmission medium availability based on a received signal strength of the message, by:

comparing the received signal strength of the message to a threshold; and when the received signal strength is below the threshold, suppressing an update to the timer;

in response to suppressing an update to the timer, activate a restricted detection mode to suppress detection of further messages not associated with the basic service set identifier;

wherein the controller is configured to activate the restricted detection mode by:

detecting a sequence of complementary sequences associated with a further message at the wireless interface;

determining whether a length of the sequence exceeds a length threshold; and when the length does not exceed the length threshold, suppressing detection of the further message.

6. The communications device of claim 5, wherein the controller is configured to determine whether the message is associated with the basic service set identifier by comparing the basic service set identifier with at least one of a receiver address or a sender address contained in the message.

7. The communications device of claim 5, wherein the controller is configured to:

set the threshold based on a received signal strength associated with a second communications device associated with the basic service set identifier.

8. The communications device of claim 5, wherein the controller is configured to:

when the message is associated with the basic service set identifier, update the timer based on a duration value contained in the message.

* * * * *